United States Patent
Jafarian

(10) Patent No.: US 9,807,790 B2
(45) Date of Patent: Oct. 31, 2017

(54) MAXIMUM AWAY DURATION

(71) Applicant: QUALCOMM Incorporated, San Diego, CA (US)

(72) Inventor: Amin Jafarian, Princeton, NJ (US)

(73) Assignee: QUALCOMM Incorporated, San Diego, CA (US)

(*) Notice: Subject to any disclaimer, the term of this patent is extended or adjusted under 35 U.S.C. 154(b) by 224 days.

(21) Appl. No.: 14/528,850

(22) Filed: Oct. 30, 2014

(65) Prior Publication Data
US 2015/0117436 A1    Apr. 30, 2015

Related U.S. Application Data

(60) Provisional application No. 61/898,414, filed on Oct. 31, 2013.

(51) Int. Cl.
| | |
|---|---|
| *H04W 74/00* | (2009.01) |
| *H04W 76/02* | (2009.01) |
| *H04W 48/08* | (2009.01) |
| *H04W 88/04* | (2009.01) |
| *H04W 84/12* | (2009.01) |

(52) U.S. Cl.
CPC ........... *H04W 74/00* (2013.01); *H04W 76/02* (2013.01); *H04W 48/08* (2013.01); *H04W 84/12* (2013.01); *H04W 88/04* (2013.01)

(58) Field of Classification Search
CPC ............. H04W 84/12; H04W 52/0216; H04W 52/0229; H04W 88/08; H04W 74/06; H04W 74/00; H04W 48/14; H04W 52/0209; H04W 72/0406; H04W 74/002;
(Continued)

(56) References Cited

U.S. PATENT DOCUMENTS

| | | | | |
|---|---|---|---|---|
| 8,072,895 B2 * | 12/2011 | Seok | ............... | H04W 64/00 370/252 |
| 8,682,368 B2 * | 3/2014 | Marinier | ............... | H04W 8/005 370/328 |

(Continued)

FOREIGN PATENT DOCUMENTS

| | | |
|---|---|---|
| EP | 2784947 A1 | 10/2014 |
| EP | 2830386 A1 | 1/2015 |

(Continued)

OTHER PUBLICATIONS

International Search Report and Written Opinion—PCT/US2014/063361—PCT/US2014/063361—ISA/EPO—dated Apr. 8, 2015.

(Continued)

*Primary Examiner* — Sai Aung
(74) *Attorney, Agent, or Firm* — Knobbe< Martens, Olson & Bear, LLP

(57) ABSTRACT

Systems and methods for establishing associations on a wireless network, where the associations require a device to be available to the requesting device for a portion of time within a maximum time away period, are disclosed. In one aspect, a method includes determining, by the apparatus, of a time period during which the access point can be accessible to the apparatus, the generating of a message identifying the time period, and the transmitting of the generated message to another apparatus.

24 Claims, 9 Drawing Sheets

(58) Field of Classification Search
CPC .. H04W 12/06; H04W 56/001; H04W 52/0206
USPC .................. 370/338, 329, 236, 237, 238
See application file for complete search history.

(56) References Cited

U.S. PATENT DOCUMENTS

| | | | | |
|---|---|---|---|---|
| 9,107,205 | B2* | 8/2015 | Kwon | H04W 72/0406 |
| 9,271,291 | B2* | 2/2016 | Gauvreau | H04L 5/001 |
| 2013/0077554 | A1* | 3/2013 | Gauvreau | H04L 5/001 |
| | | | | 370/312 |
| 2014/0321317 | A1* | 10/2014 | Kasslin | H04W 4/08 |
| | | | | 370/254 |
| 2014/0349745 | A1* | 11/2014 | Russo | A63F 13/12 |
| | | | | 463/29 |
| 2015/0103767 | A1* | 4/2015 | Kim | H04W 74/06 |
| | | | | 370/329 |
| 2015/0172996 | A1* | 6/2015 | Park | H04W 74/0875 |
| | | | | 370/230 |
| 2015/0230162 | A1* | 8/2015 | Park | H04W 48/16 |
| | | | | 370/338 |
| 2016/0014773 | A1* | 1/2016 | Seok | H04W 52/0216 |
| | | | | 370/338 |

FOREIGN PATENT DOCUMENTS

| | | |
|---|---|---|
| WO | WO-2013077690 A1 | 5/2013 |
| WO | WO-2013137824 A1 | 9/2013 |
| WO | WO-2013141669 A1 | 9/2013 |

OTHER PUBLICATIONS

Jafarian A., et al. "Comment Resolution for Subclauses Misc.", IEEE Draft; 11-14-0641-01-00AH-Miscellaneous-CIDS, IEEE-SA Mentor, Piscataway, NJ USA, vol. 802.11ah, No. 1, May 15, 2014 (May 15, 2014), pp. 1-11, XP068069345.

Park M, "TGah-SFD-D14.x ; 11-13-0599-00-00-ah-tgah-sfd-d14-x", IEEE SA Mentor; 11-13-0599-00-00AH-TGAH-SFD-D14-X, IEEE-SA Mentor, Piscataway, NJ USA, vol. 802.11ah, May 15, 2013 (May 15, 2013), pp. 1-76, XP068054133.

* cited by examiner

MAXIMUM AWAY DURATION

CROSS REFERENCE TO RELATED APPLICATIONS

This Application claims the benefit of U.S. Provisional Application No. 61/898,414, filed Oct. 31, 2013, and entitled "MAXIMUM AWAY DURATION" and assigned to the assignee hereof. The disclosure of this prior application is considered part of this application, and is hereby incorporated by reference in its entirety.

BACKGROUND

Field

The present application relates generally to wireless network communications, and more specifically to systems, methods, and devices for establishing associations between apparatuses operating on a wireless network.

Description of the Related Art

In many telecommunication systems, communications networks are used to exchange messages among several interacting spatially-separated devices. Networks may be classified according to geographic scope, which could be, for example, a metropolitan area, a local area, or a personal area. Such networks would be designated respectively as a wide area network (WAN), metropolitan area network (MAN), local area network (LAN), wireless local area network (WLAN), or personal area network (PAN). Networks also differ according to the switching/routing technique used to interconnect the various network nodes and devices (e.g. circuit switching vs. packet switching), the type of physical media employed for transmission (e.g. wired vs. wireless), and the set of communication protocols used (e.g. Internet protocol suite, SONET (Synchronous Optical Networking), Ethernet, etc.).

Wireless networks are often preferred when the network elements are mobile and thus have dynamic connectivity needs, or if the network architecture is formed in an ad hoc, rather than fixed, topology. Wireless networks employ intangible physical media in an unguided propagation mode using electromagnetic waves in the radio, microwave, infra-red, optical, etc. frequency bands. Wireless networks advantageously facilitate user mobility and rapid field deployment when compared to fixed wired networks.

One or more devices in a wireless network may be configured to provide services. For example, a device may include hardware, such as a sensor, that is used to capture data. An application running on the device may then use the captured data to perform an operation. In some cases, the captured data may be useful to other devices in the wireless network. Some other devices in the wireless network may include similar hardware so as to capture similar data. Alternatively, the device could provide these services (e.g., the captured data) to one or more other devices in the wireless network. The device may inform the one or more other devices in the wireless network of the services that the device provides by advertising this information over the wireless network. Other devices may further advertise the services provided by a device to other devices not within range or capable of direct communication with the service provider. However, communication of the aggregate of all available services, in combination with all necessary beaconing, messaging and computational overhead, may result in increased network loading and decreased data throughput availability given the required collision avoidance schemes implemented to avoid collisions of beacons and packets.

Thus, improved systems, methods, and devices for communicating in a wireless network are desired.

SUMMARY

The systems, methods, and devices of the invention each have several aspects, no single one of which is solely responsible for its desirable attributes. Without limiting the scope of this invention as expressed by the claims which follow, some features will now be discussed briefly. After considering this discussion, and particularly after reading the section entitled "Detailed Description" one will understand how the features of this invention provide advantages that include improved communications between access points and stations in a wireless network.

An aspect of this disclosure may be an apparatus for wireless communication comprising a processing system configured to determine a time period during which an access point could be accessible to the apparatus for at least a portion of time. Additionally, the processing system is configured to generate a message indicating the time period and provide the message for transmission to the access point.

Another aspect may be an apparatus for wireless communication comprising a processing system configured to receive a message from a station indicating a time period and determine whether the apparatus can be accessible to the station for at least a portion of time within the time period. The processing system is configured to thereafter generate a second message indicating whether the apparatus will be accessible during the portion of time within the first time period and provide the second message for transmission to the station.

An additional aspect may be a method for an apparatus to establish an association with an access point on a network comprising the determining, by the apparatus, of a time period during which the access point could be accessible to the apparatus for at least a portion of time, the generating of a message indicating the time period, and the transmitting of the generated message to the access point.

An additional aspect may be a method for an apparatus to establish an association on a wireless network comprising the receiving, by the apparatus, of a message from a station indicating a time period, the determining of whether or not the apparatus can be accessible to the station for at least a portion of time within the time period, the generating of a second message indicating whether the apparatus will be accessible during the portion of time within the time period, and the transmitting of the second message to the station.

Another aspect may be a wireless node for wireless communication comprising a processing system configured to determine a time period during which another wireless node could be accessible to the wireless node for at least a portion of time and generate a message indicating the time period, and an antenna configured to transmit the message to the other wireless node.

Another aspect may be a wireless node for wireless communication comprising a processing system configured to receive a message indicating a time period from another wireless node, determine whether the wireless node can be accessible to the other wireless node for at least a portion of time during the time period, and generate a second message indicating whether the wireless node will be accessible during the portion of time within the time period and an antenna configured to transmit the second message to the other wireless node.

Another aspect may be a computer program product for communication comprising a computer readable medium comprising instructions that when executed cause an apparatus to determine a time period during which another apparatus could be accessible to the apparatus for at least a portion of time and generate a message indicating the time period.

An alternate aspect may be a computer program product for communication comprising a computer readable medium comprising instructions that, when executed, cause an apparatus to receive a message from another apparatus indicating a time period, determine whether the apparatus can be accessible to the other apparatus for at least a portion of time within the time period, generate a second message indicating whether the apparatus will be accessible during the portion of time within the time period, and provide the second message for transmission to the other apparatus.

DETAILED DESCRIPTION OF THE PREFERRED ASPECT

Figure 1:
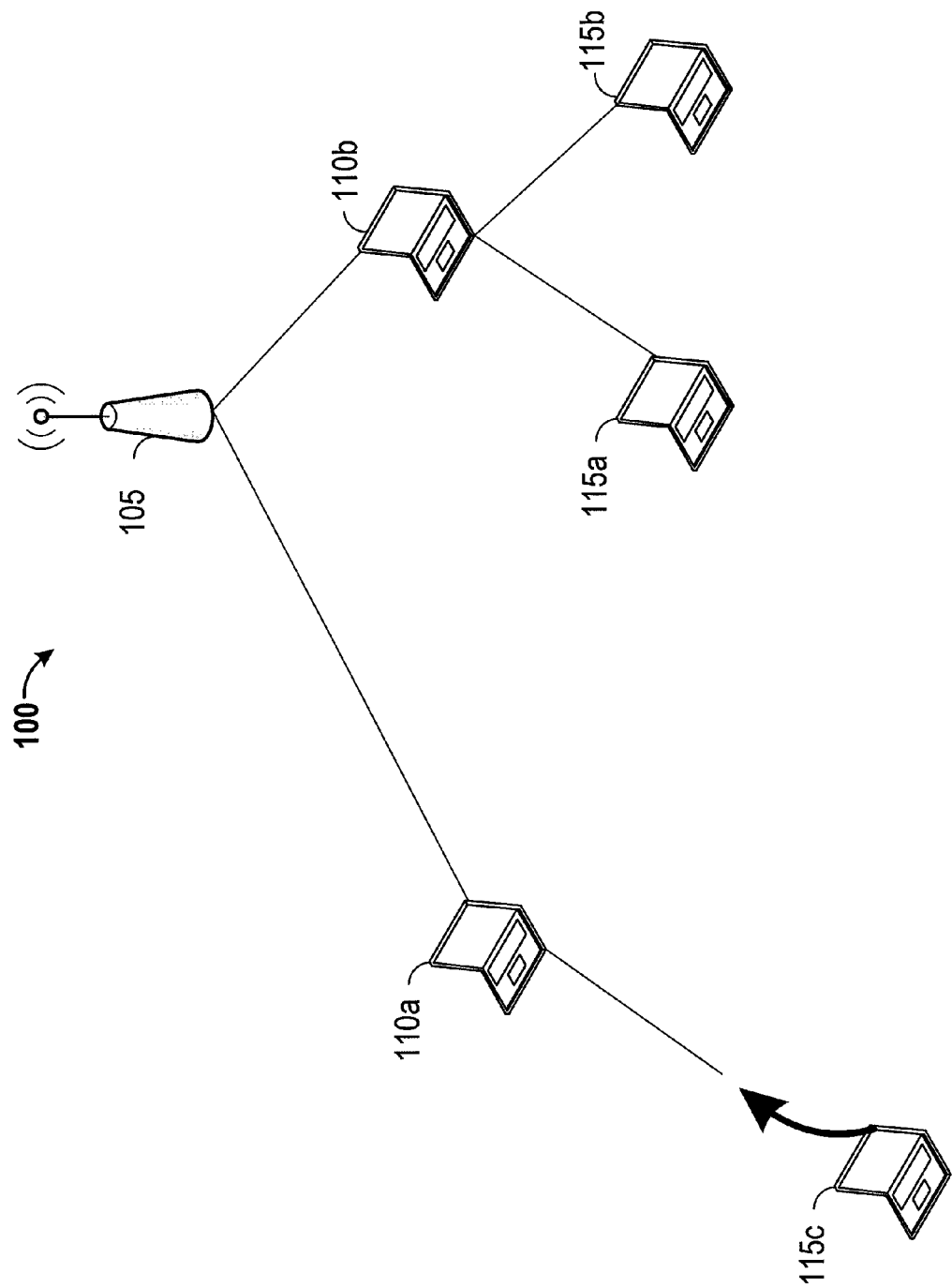
FIG. 1 illustrates one possible organization of a wireless network with existing devices and devices interested in joining the wireless network.

Various aspects of the novel systems, apparatuses, and methods are described more fully hereinafter with reference to the accompanying drawings. The teachings disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the novel systems, apparatuses, and methods disclosed herein, whether implemented independently of or combined with any other aspect of the invention. For example, an apparatus may be implemented or a method may be practiced using any number of the aspects set forth herein. In addition, the scope of the invention is intended to cover such an apparatus or method which is practiced using other structure, functionality, or structure and functionality in addition to or other than the various aspects of the invention set forth herein. It should be understood that any aspect disclosed herein may be embodied by one or more elements of a claim.

Although particular aspects are described herein, many variations and permutations of these aspects fall within the scope of the disclosure. Although some benefits and advantages of the preferred aspects are mentioned, the scope of the disclosure is not intended to be limited to particular benefits, uses, or objectives. Rather, aspects of the disclosure are intended to be broadly applicable to different wireless technologies, system configurations, networks, and transmission protocols, some of which are illustrated by way of example in the figures and in the following description of the preferred aspects. The detailed description and drawings are merely illustrative of the disclosure rather than limiting, the scope of the disclosure being defined by the appended claims and equivalents thereof.

Wireless network technologies may include various types of wireless local area networks (WLANs). A WLAN may be used to interconnect nearby devices together, employing widely used networking protocols. The various aspects described herein may apply to any communication standard, such as Wi-Fi or, more generally, any member of the IEEE 802.11 family of wireless protocols. For example, the various aspects described herein may be used as part of the IEEE 802.11ah protocol, which uses sub-1 GHz bands.

In some aspects, wireless signals in a sub-gigahertz band may be transmitted according to the 802.11ah protocol using orthogonal frequency-division multiplexing (OFDM), direct-sequence spread spectrum (DSSS) communications, a combination of OFDM and DSSS communications, or other schemes. Implementations of the 802.11ah protocol may be used for sensors, metering, and smart grid networks. Advantageously, aspects of certain devices implementing the 802.11ah protocol may consume less power than devices implementing other wireless protocols, and/or may be used to transmit wireless signals across a relatively long range, for example about one kilometer or longer.

In some implementations, a WLAN includes various devices which are the components that access the wireless network. For example, there may be three types of devices: access points ("APs"), relays, and clients (also referred to as stations, or "STAs"). In general, an AP serves as a hub or base station for the WLAN, a relay device provides a communication link between the AP for the WLAN and one or more STAs, which serve as users of the WLAN. For example, an STA may be a laptop computer, a personal digital assistant (PDA), a mobile phone, etc. In an example, an STA connects to an AP, through a relay device, via Wi-Fi (e.g., IEEE 802.11 protocol such as 802.11ah) compliant wireless links to obtain general connectivity to the Internet or to other wide area networks. In some implementations, an STA may also be used as a relay device.

An access point ("AP") may also comprise, be implemented as, or known as a NodeB, Radio Network Controller ("RNC"), eNodeB, Base Station Controller ("BSC"), Base Transceiver Station ("BTS"), Base Station ("BS"), Transceiver Function ("TF"), Radio Router, Radio Transceiver, or some other terminology.

A station "STA" may also comprise, be implemented as, or known as an access terminal ("AT"), a subscriber station, a subscriber unit, a mobile station, a remote station, a remote terminal, a user terminal, a user agent, a user device, user equipment, or some other terminology. In some implementations, an access terminal may comprise a cellular telephone, a cordless telephone, a Session Initiation Protocol ("SIP") phone, a wireless local loop ("WLL") station, a personal digital assistant ("PDA"), a handheld device having wireless connection capability, or some other suitable processing device connected to a wireless modem. Accordingly, one or more aspects taught herein may be incorporated into a phone (e.g., a cellular phone or smartphone), a computer (e.g., a laptop), a portable communication device, a headset, a portable computing device (e.g., a personal data assistant), an entertainment device (e.g., a music or video device, or a satellite radio), a gaming device or system, a global positioning system device, or any other suitable device that is configured to communicate via a wireless medium.

A wireless node may comprise an access terminal ("AT") or STA, an AP or a relay-capable wireless device having at least one of a STA or AP operation, i.e., a wireless node may have AT or STA operation, AP operation, or both AT/STA and AP operations.

As discussed above, certain of the devices described herein may implement the 802.11ah standard, for example. Such devices, whether used as an STA, a relay device, an AP, or other device, may be used for smart metering or in a smart grid network. Such devices may provide sensor applications or be used in home automation. The devices may instead or in addition be used in a healthcare context, for example for personal healthcare. They may also be used for surveillance, to enable extended-range Internet connectivity (e.g. for use with hotspots), or to implement machine-to-machine communications.

Referring to FIG. 1, a particular illustrative aspect of a wireless communication system is depicted and generally designated 100. Communications within the wireless communication system 100 may occur pursuant to a wireless standard, for example the 802.11ah, 802.11ai, or 802.11s standards. The wireless communication system 100 may include an access point 105, which may operate as the "root node" or base station for the wireless communication system 100. The access point 105 may communicate with one or more wireless nodes (or stations or STAs) directly or through one or more relay devices. For example, wireless nodes 110a-110b may function as relay devices in wireless communication system 100. Relay device 110b allows wireless nodes 115a and 115b (functioning as stations) to communication with the access point 105. Wireless nodes 110a-b and 115a-b may be referred to as "members" of wireless communication system 100 as they are either actively or passively participating in communications within the wireless communication system 100.

A fifth wireless node, 115c, is not currently a member of the wireless communication system 100, though wireless node 115c is interested in joining the wireless communication system 100. In order to establish a connection with the access point 105, wireless node 115c may need to first establish an association. In looking to define such an association, the device 115c may have specific criteria the access point 105 is capable of meeting in order to guarantee an association that meets the needs of wireless node 115c. These requirements may include the maximum amount of time the access point 105 can be inaccessible to the requesting wireless node, the maximum number of relays or wireless nodes the access point 105 may allow to join the wireless communication system 100, or the minimum bandwidth allowed on the wireless communication system 100. Although FIG. 1 shows a particular arrangement of relay devices and wireless nodes, this particular arrangement is only exemplary and is not intended to be construed as limiting the concepts of the present application to the particular arrangement shown.

The wireless nodes 110a-110b and 115a-115c are not limited in type and may include a variety of different devices. By way of example and not limitation, wireless nodes 110a-110b and 115a-115c may include a cellular phone, a television, a laptop, a router, and a number of sensors, e.g., a weather sensor or other sensor capable of communicating using a wireless protocol.

Figure 2:
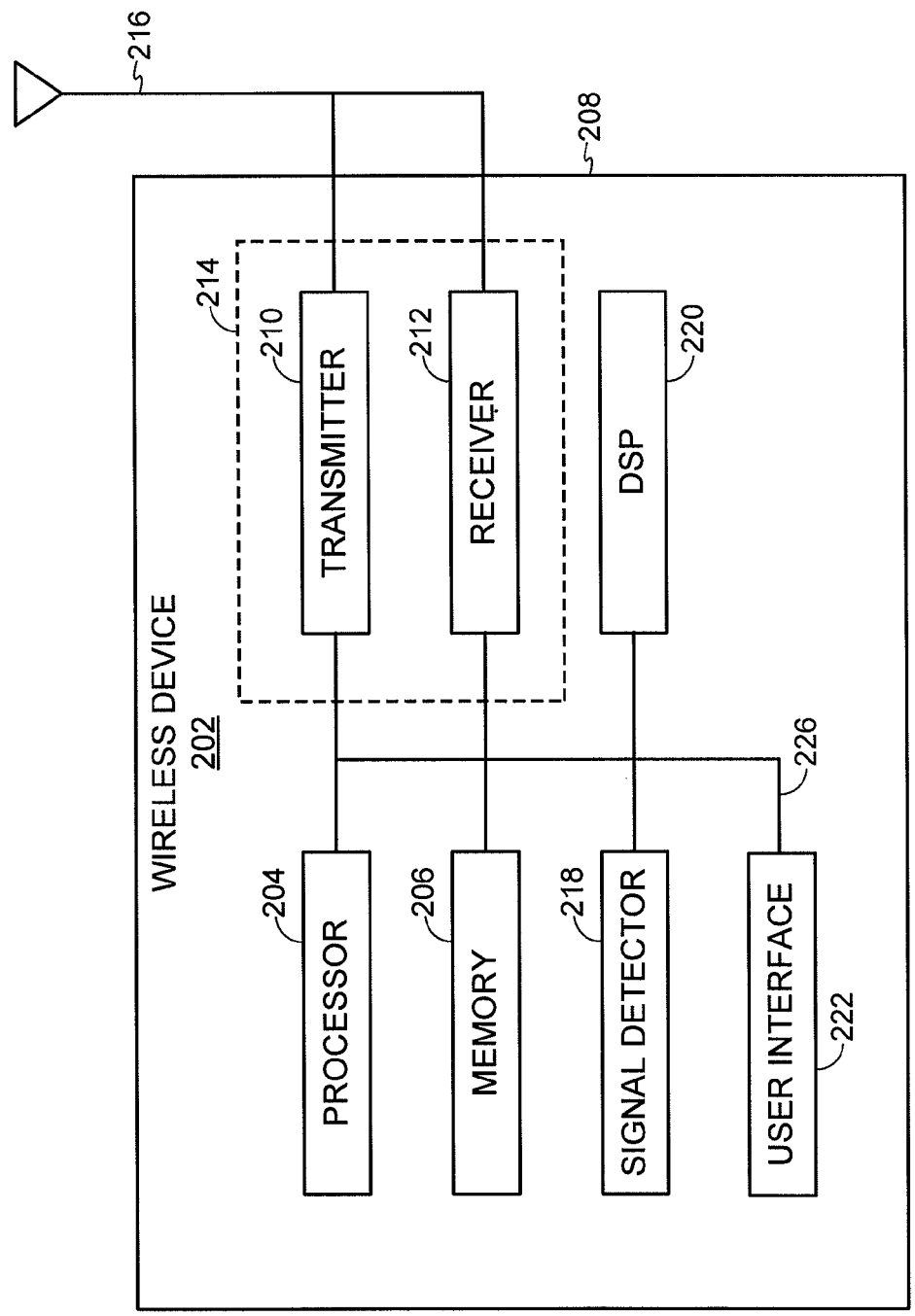
FIG. 2 shows an aspect of a device which may comprise one or more of the devices of FIG. 1.

FIG. 2 illustrates various components that may be utilized in a wireless node 202 that may be employed within the wireless communication system 100. The wireless node 202 is an example of a device that may be configured to implement the various methods described herein. For example, the wireless node 202 may comprise the access point 105, or one of wireless nodes 110a-110b, or one of wireless nodes 115a-115c, for example.

The wireless node 202 may include a processor 204 which controls operation of the wireless node 202. The processor 204 may also be referred to as a central processing unit (CPU), a hardware processor, or a processing system. Memory 206, which may include both read-only memory (ROM) and random access memory (RAM), provides instructions and data to the processor 204. A portion of the memory 206 may also include non-volatile random access memory (NVRAM). The processor 204 performs logical and arithmetic operations based on program instructions stored within the memory 206. The instructions in the memory 206 may be executable to implement the methods described herein.

The processor 204 may comprise or be a component of a processing system implemented with one or more processors. The one or more processors may be implemented with any combination of general-purpose microprocessors, microcontrollers, digital signal processors (DSPs), field programmable gate array (FPGAs), programmable logic devices (PLDs), controllers, state machines, gated logic, discrete hardware components, dedicated hardware finite state machines, or any other suitable entities that can perform calculations or other manipulations of information.

The processing system may also include non-transitory computer-readable medium comprising code that, when executed, causes an apparatus to perform one or more steps associated with one or more methods for modifying relay operation of a relay-compatible wireless node. Code may include source code format, binary code format, executable code format, or any other suitable format of code. The code, or instructions, when executed by one or more processors, causes the processing system to perform the various functions described herein.

The wireless node 202 may also include a transmitter 210 and a receiver 212 to allow transmission and reception of data between the wireless node 202 and a remote location. Further, the transmitters 210 and the receiver 212 may be configured to allow transmission and reception of setup and/or configuration packets or frames between the wireless node 202 and a remote location including, for example, an AP, a relay device, or an STA. The transmitter 210 and receiver 212 may be combined into a transceiver 214. An antenna 216 may be attached to the housing 208 and electrically coupled to the transceiver 214. Alternatively, or additionally, the wireless node 202 may include an antenna 216 formed as part of the housing 208 or may be an internal antenna. The wireless node 202 may also include (not shown) multiple transmitters, multiple receivers, multiple transceivers, and/or multiple antennas.

The wireless node 202 may also include a signal detector 218 that may be used in an effort to detect and quantify the level of signals received by the transceiver 214. The signal detector 218 may detect such signals as total energy, energy per subcarrier per symbol, power spectral density and other signals. The wireless node 202 may also include a digital signal processor (DSP) 220 for use in processing signals. The DSP 220 may be configured to generate a data unit for transmission. In some aspects, the data unit may comprise a physical layer data unit (PPDU). In some aspects, the PPDU is referred to as a packet or a frame.

The wireless node 202 may further comprise a user interface 222 in some aspects. The user interface 222 may comprise a keypad, a microphone, a speaker, and/or a display. The user interface 222 may include any element or component that conveys information to a user of the wireless node 202 and/or receives input from the user.

The various components of the wireless node 202 may be housed within a housing 208. Further, the various components of the wireless node 202 may be coupled together by a bus system 226. The bus system 226 may include a data bus, for example, as well as a power bus, a control signal bus, and a status signal bus in addition to the data bus. Those of skill in the art will appreciate the components of the wireless node 202 may be coupled together, or may accept or provide inputs to each other using some other mechanism.

Although a number of separate components are illustrated in FIG. 2, those of skill in the art will recognize that one or more of the components may be combined or commonly implemented. For example, the processor 204 may be used to implement not only the functionality described above with respect to the processor 204, but also to implement the functionality described above with respect to the signal detector 218 and/or the DSP 220. Further, each of the components illustrated in FIG. 2 may be implemented using a plurality of separate elements.

Figure 3:
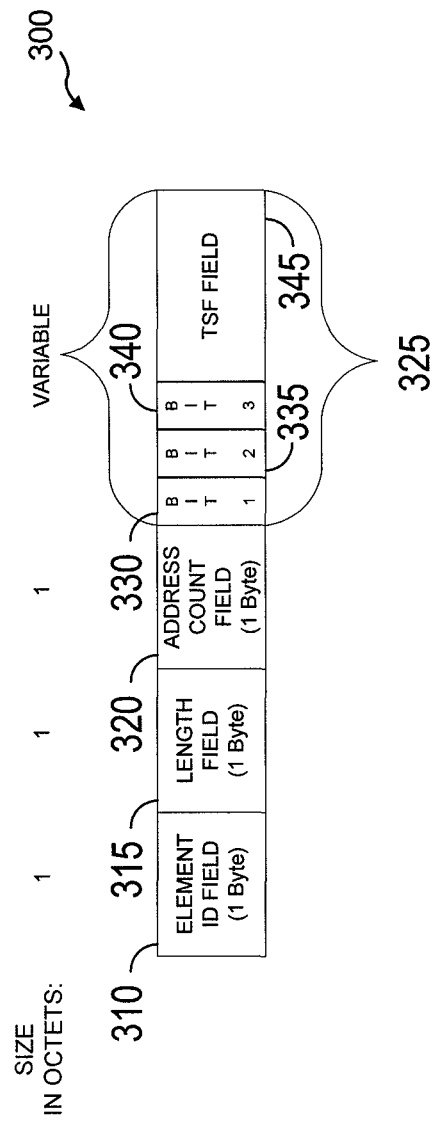
FIG. 3 shows an aspect of the instruction element (message data block) used to communicate information between devices of FIG. 1.

FIG. 3 refers to an exemplary aspect of a message 300 available to be used for communications between the joining wireless node 115c and the access point 105. The message 300 may take the form of an information element (IE). Those skilled in the art will appreciate that the message 300 may have more or fewer components than FIG. 3 illustrates. The message 300 may be communicated between the access point 105 and the interested wireless node 115c embedded in any one of an: action frame, action acknowledge frame, probe request frame, probe response frame, association request frame, and association response frame.

In an exemplary aspect, message 300 may include one or more bytes of information to be communicated between the devices. The message 300 may include three bytes of information included in messages being transmitted. These three bytes may include: the element ID field 310, of size 1 byte, intended to uniquely identify the message 300. The length field 315, also of size 1 byte, may further be included in the message 300 to indicate the length of the message 300. The address count field 320, of size 1 byte, may further be included in the message 300 indicating, as an integer, a number of reachable addresses that may be included in a variable-length reachable address field (not depicted) of the message 300. Appended to these initial three bytes may be additional information 325 of a size of at least one byte. This additional information 325 may be divided into individual bits or fields to indicate specific information as required by the particular aspect.

In one aspect, the additional information 325 may be broken into three individual bits and a five bit field. The individual bits may be known by those of skill in the art to operate as flags or indicators. For example, one bit may be an indicator bit as to whether or not the particular information element is a request or a response, request/response bit 330. The second bit may be an indicator as to whether or not a maximum away time is being requested, maximum time away bit 335. A third bit may be an indicator as to whether or not any previous maximum away time negotiation is being accepted or rejected, accept/reject bit 340. The remaining 5 bits of the additional byte of information may be dedicated to a timing synchronization function (TSF) field 345. This TSF field 345 may indicate the period of time being requested during which the access point guarantees to be accessible (or could be accessible) to the station for at least a portion of time. In the discussion below, the guarantee may correspond to an indication that the access point can be accessible for the at least a portion of time. For example, if a wireless node 115c wants to create an association with an access point 105, the wireless node 115c might transmit a probe request in which is embedded message 300. Message 300 may include the first bytes of element ID field 310, length field 315, and address count field 320, along with additional information 325. Additional information 325 may include bits to flag information contained within. For example additional information 325 may include request/response Bit 330 set to '1' to indicate the message is a request. Maximum time away bit 335 (set to '1') may be included to indicate the message 300 is related to obtaining a guarantee that the access point not be inaccessible beyond a maximum time period. TSF field 345 may be included in the message 300 containing the maximum time period as established by the wireless node 115c desiring to create an association.

In an alternate aspect, there may be additional information included in message 300 (information element). Message 300 may instead be used for requesting guarantees from the access point 105, for example maximum number of devices allowed to associate with the access point, minimum bandwidth required by the access point, etc. The additional information 325 may include additional bits and fields (not shown) for number of devices allowed or bandwidth setting, or any other guarantee requirement. The additional information 325 may be of sufficient length so as to include all guarantee elements required by the wireless node 115c.

Figure 4:
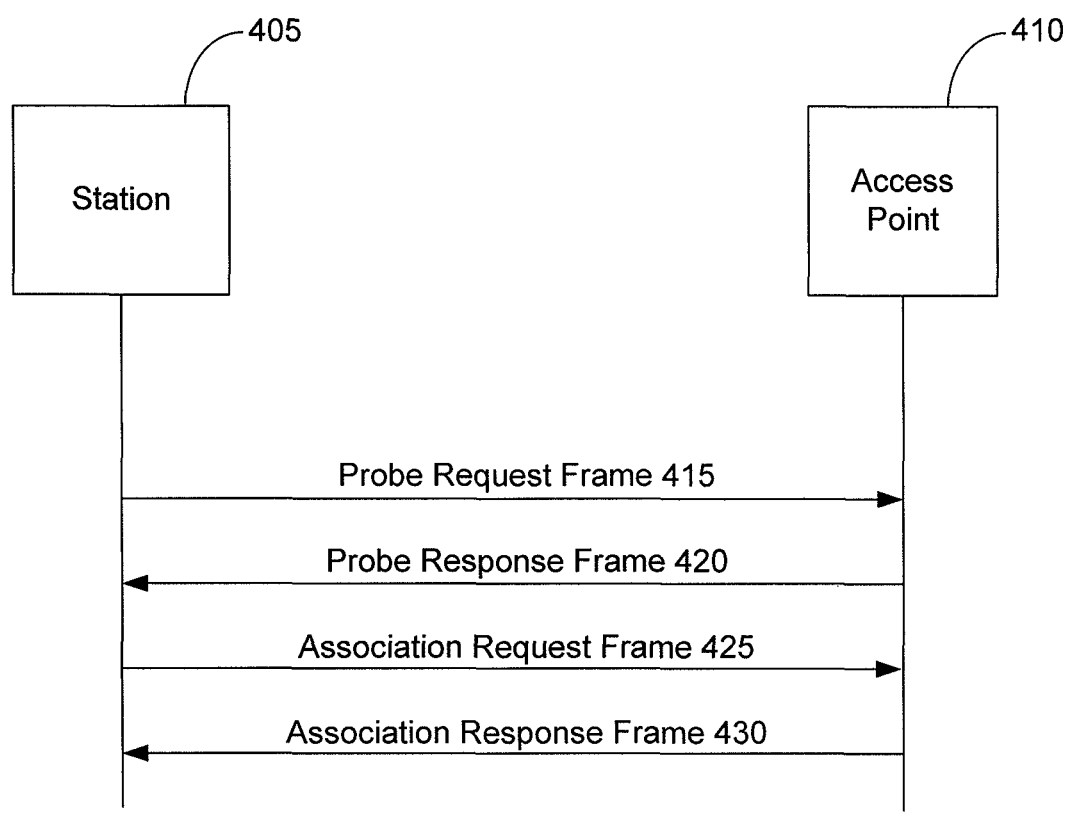
FIG. 4 illustrates the communications exchanged between a station and the access point of the network.

FIG. 4 is a call flow diagram of a method for establishing an association between a station and an access point, in accordance with one implementation, and generally designated 400. FIG. 4 shows two devices. In one aspect, these devices may be a station 405 and an access point 410. In one aspect, the association process may begin with the determination of a maximum time away period for the access point (not shown) and the generating of a message from the station 405 to the access point 410. The next step is the probe request frame 415 being sent from the station 405 to the access point 410. The probe request frame 415 may include a request by the station 405 that the access point 410 guarantee to meet specific criteria as stipulated by the station 405. For example, the station 405 may request that access point 410 guarantees to be accessible to the station 405 for at least a portion of the maximum time away period within a specific time. An alternate aspect may restrict the number of devices allowed to associate with the access point 410 to a maximum number or establish a maximum or minimum bandwidth on the channel. The probe request frame 415 may include a message 300 embedded therein, where the message 300 may include element ID field 310, length field 315, address count field 320, and additional information 325. The additional information 325 of the message 300 embedded in the probe request frame 415 may include indicator flag bits to inform what criteria the station 405 is requesting the access point 410 guarantee to meet. For example, in one aspect, additional information 325 in the information element of probe request frame 415 may include a request/response bit 330 (set to '1') to indicate a request being included in the message 300. The additional information 325 may also include a maximum time away bit 335 to indicate the probe request frame is requesting the access point 410 guarantee to meet the maximum time away and to indicate that there is a time duration stored in the TSF field 340. Additional information 325 may also include an accept/reject bit 335 to indicate if the sending device accepts or rejects any prior maximum time away negotiation.

Though not shown in FIG. 4, access point 410, upon receipt of probe request frame 415 or association request frame 425 may determine if it can guarantee to meet the criteria requested by the station 405 in the frame it received, if any. Such determination may take place internally to the access point 410.

The aspect exemplified in FIG. 4 also includes a probe response frame 420 being sent from the access point 410 to the station 405. The probe response frame 420 may contain the message generated by the access point 410 in response to the receiving of the probe request frame 415. This message may be in the form of message 300 depicted in FIG. 3. The message 300 embedded in the probe response frame 420 may include the element ID field 310, length field 315, and address count field 320. Where the station 405 included requests in probe request frame 415, probe response frame 420 may include responses to those requests. For example, the probe response frame 420 may include additional information 325 including request/response bit 330 set to '0' to indicate the frame is a response frame. The probe response frame 420 may also include maximum time away bit 335 (set to '1') to indicate the response relates to the maximum time away request previously presented to the access point 410 and to indicate the inclusion of a TSF field 340 in the probe response frame 420. Additional information 325 may also include an accept/reject bit 340 set to '1' to indicate the access point 410 accepts the request by the station 405 to guarantee to be accessible within the period specified in TSF field 345 or rejects to the request presented by the station 405. In an aspect, if the access point accepts to the maximum time away period requested by the station 405, the probe response frame 420 may include a value in the TSF field 345 matching that which was included in the TSF field of the probe request frame 415 sent from the station 405 to the access point 410. Alternatively, the TSF Field 340 may be set to a value between '0' and the value included in the probe request frame 415 to indicate the access point is willing to negotiate a maximum time away period. In such an aspect, the accept/reject bit 335 may be set to '0' to indicate rejection of the station 405 request for a different time value.

In another aspect, the accept/reject bit 340 included in the probe response frame may be set to '0' to indicate the access point 410 does not guarantee the maximum time away period as requested by the station 405, and the TSF Field 340 may be set to '0', indicating the access point 410 is not willing to negotiate an acceptable maximum time away duration with the station 405.

In some aspects, prior to sending a probe request frame 415 or association request frame 425 to the access point 410, the station 405 may determine what criteria the access point may be required to guarantee to meet before establishing an association. In other aspects, these criteria may be previously established and not require the station 405 to determine them itself, but rather extract from memory, prior to sending the request frames. In some other aspects, upon receipt of a probe response frame 420 or association response frame 430, the station 405 may determine if it finds the guarantees of the access point 410 acceptable.

In some aspects, if the probe response frame 420 indicates the access point guarantees to meet the criteria requested by the station 405 in the probe request frame 415, the association request frame 425 may include the same information as the probe request frame 415 and response frame 420. In other aspects, if the probe response frame 420 indicates the access point does not accept the criteria requested by the station 405 but does suggest a second criteria, the station may submit another probe request frame 415 with the same information as the probe response frame 420 or may submit an association request frame 425 with the new information or may refrain from continuing the attempt to associate with access point 410.

The aspect depicted in FIG. 4 is not inclusive of all possible communications between station 405 and access point 410. In negotiating the maximum time away guarantee, fewer or additional probe requests frames 415, probe response frames 420, association request frames 425, or association response frames 430 may be required. In other aspects, the wireless communication system 100 may be established such that failure to respond to a probe request frame 415 or association request frame 425 is deemed to be an acceptance of the terms of the request. In some other aspects, such failure to respond may be deemed to be a total rejection of the terms of the request.

As shown in FIG. 4, an aspect may include the station 405 sending an association request frame 425 to the access point 410. In some aspects, an association request frame 425 may be preceded by probe request frame 415 and probe response frame 420. In some other aspects, an association request frame 425 may be the first frame communicated between the station 405 and the access point 410. In some other aspects, an association request frame 425 may be preceded by other association request frames. The association request frame 425 may be used to continue and facilitate association negotiations between the devices.

In an aspect, an association request frame 425 may include an information element as structured in the probe request frame 415 as discussed above. If the association request frame 425 was preceded by the probe request/response frames 415 and 420 and the station 405 finds the guarantees in the probe response frame 420 acceptable, then association request/response frame 425 may be embedded with an information element containing the guarantees specified in the probe response frame 420. If station 405 does not find the guarantee(s) in the probe response frame 420 acceptable, then the station 405 may utilize the association request frame 425 to further negotiations with the access point 410. In an alternate aspect, if the station 405 does not find the guarantee(s) in the probe response frame 415 acceptable, the station 405 may choose to not to establish an association with access point 410.

As shown in FIG. 4, an aspect may include the access point 410 sending an association response frame 430 to the station 405. In some aspects, an association response frame 430 may be preceded by probe request frame 415, probe response frame 420, and association request frame 425. In some other aspects, an association response frame 425 may be preceded by other association response frames. The association response frame 430 may be used to continue and facilitate association negotiations between the devices.

In an aspect, an association response frame 430 may include an information element as structured in the probe request frame 415, probe response frame 420, and association request frame 425 as discussed above. The contents of the association response frame 430 may depend on the determination (not shown) by the access point of whether or not to accept the guarantee(s) proposed by the station 405 in either a probe request frame 415 or association request frame 425. In some aspects, a probe request frame 415 may not be required in the association negotiation process, and the access point 410 may respond to only the association request frame 425. In another aspect, the access point 410 may request a probe request/response frame 415/420 exchange before receiving and responding to an association request frame 425. If the association response frame 430 was preceded by the probe request/response frames 415 and 420 or the association request frame 425 and the access point 410 finds the guarantees in the probe response frame 420 or association request frame 425 acceptable, then association response frame 430 may be embedded with an message 300 containing the guarantees agreed to from the probe/association request frame 415 and/or 425. If access point 410 does not find the guarantee requested in the probe request frame 415 or association request frame 425 acceptable, then the access point 410 may choose to provide an alternate time period in the association response frame 430 or to reject any guarantee. If proposing a new guarantee, the access point may utilize a message 300 structured as depicted in FIG. 3. Message 300 may include the element ID field 310, the length field 315, the address count field 320, and additional information 325, including request/response bit 330 (may be set to '0' to indicate this is a response), maximum time away bit 335 (may be set to '1' to indicate a maximum time away guarantee), and accept/reject bit 340 (may be set to '0' to indicate a rejection of the proposed time). Additionally, access point 410 may include a value greater than '0' in TSF field 345 to indicate a proposed maximum time away duration. In an alternate aspect, access point 410 may include a value of '0' in the TSF field 345 to indicate it is not willing to guarantee a maximum time away. The access point 410 may utilize association response frame 430 to further negotiations with the station 405. In an alternate aspect, if the access point 405 does not find the guarantee(s) in the association request frame 425 acceptable, the access point 410 may choose to not to establish an association with station 405.

Figure 5:
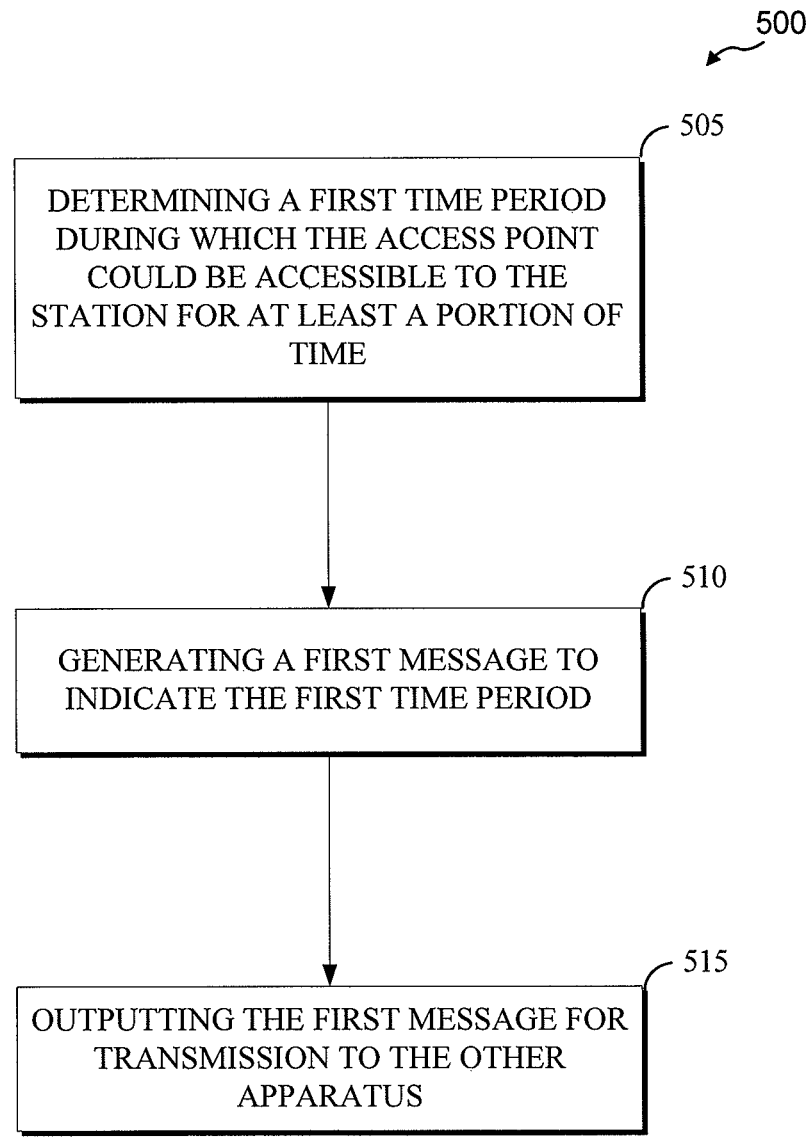
FIG. 5 represents a flowchart of a method for a station of establishing an association between itself and an access point.

FIG. 5 is a flowchart of a method establishing an association between a station and an access point on the wireless network. Process 500 may be performed by wireless node 110a-b or 115a-c shown in wireless communication system 100. Other aspects of process 500 may instead be used for requesting other guarantees from the access point 105, for example maximum number of devices allowed to associate with the access point, minimum bandwidth required by the access point, etc. The additional information 325 of message 300 from FIG. 3 may include additional bits and fields (not shown) for number of devices allowed or bandwidth setting, or any other guarantee requirement.

In block 505, the station may determine a first time period during which the access point could be accessible to the station for at least a portion of time before requesting the association. As depicted in FIG. 4, this determination may occur before the first probe request frame or association request frame is sent to the access point 410. In some aspects, this determination may be made by the station 405 itself. In some other aspects, the determination may be made by the manufacturer or user of the station 405 and stored in memory, or any other party associated with the station 405. In additional aspects, the determination may be made based on an operational requirement of the apparatus, user input, manufacturer specifications, and memory.

By way of example and not limitation, such criteria may be a maximum time away duration or minimum bandwidth allowed or maximum number of devices allowed on the wireless network.

In block 510, the station (station 405 as depicted in FIG. 4) generates a first message to indicate the first time period. The first message may correspond to message 300 and may be generated to be sent to the access point (access point 410). Message 300 may be embedded in the probe request frame 415 or the association request frame 425. The station 405 may use this message 300 to communicate the criteria determined in block 505 to the access point 410. This message may also contain the information discussed above that the access point 410 guarantee to meet the criteria specified prior to establishing the association between the station and access point. In message 300, the station 405 may include the element ID field 310, the information element length field 315, the address count field 320, and additional information 325 including a request/response bit 330 set to '1' to indicate a request, a maximum time away bit 335 set to '1' to indicate a maximum time away request, and an accept/reject bit 340. The additional information may include a TSF field 345 indicating the maximum time away the access point 410 may be inaccessible to the station 405 as determined by station 405.

In block 515, the requesting device station 405 outputs the first message for transmission to the other apparatus, which may comprise the access point 410. Outputting the first message may comprise transmitting the message, which may include embedding the message 300 in a probe request frame 415 or an association request frame 425.

Figure 6:
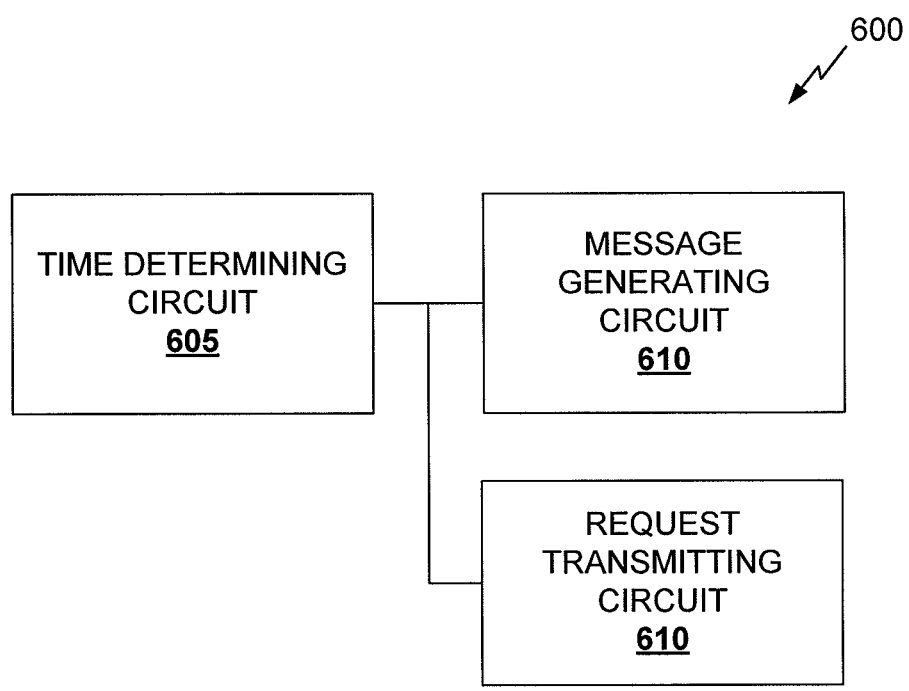
FIG. 6 shows a function block diagram of a station establishing an association with an access point wherein the association requires a guarantee from the access point.

FIG. 6 is a functional block diagram of an exemplary device 600 that may be employed within the wireless communication system 100. The device 600 comprises a time determining circuit 605, a message generating circuit 610, and a request transmitting circuit 610. The time determining circuit may be configured to perform one or more of the functions discussed above with respect to the block 505 illustrated in FIG. 6. The time determining circuit may correspond to one or more of the processor 204, the memory 206 or the user interface 222 depicted in FIG. 2. In some aspects, means for determining a time period may include the time determining circuit 605.

The message generating circuit 610 may be configured to perform one or more of the functions discussed above with respect to block 510 illustrated in FIG. 5. The message generating circuit may correspond to one or more of the processor 204, memory 206, the transmitter 212, or the transceiver 214 of FIG. 2. In some aspects, means for generating a message may include the message generating circuit 610.

The request transmitting circuit 610 may be configured to perform one or more of the functions discussed above with respect to block 515 illustrated in FIG. 5. The request transmitting circuit 615 may correspond to one or more of the processor 204, the transmitter 212, or the transceiver 214. In some aspects, means for providing the message may include the request transmitting circuit 615.

In some other aspects, the device 600 may further comprise a message embedding circuit (not shown) configured to embed the message in one of a probe request frame, a probe response frame, an association request frame, an association response frame, an action frame, and an action acknowledge frame. In some aspects, the embedding circuit may include the processor 204 and/or the DSP 220. In some aspects, means for embedding the message may include the message embedding circuit. In some other aspects, the device 600 may further comprise a message receiving circuit (not shown) configured to receive a message. In some aspects, the message receiving circuit may include the processor 204, the receiver 210, the transceiver 214, and/or the DSP 220. In some aspects, means for receiving a message may include the message receiving circuit. In some other aspects, the device 600 may further comprise a response receiving circuit (not shown) configured to receive a response from the other apparatus. In some aspects, the response receiving circuit may include the processor 204, the receiver 210, the transceiver 214, and/or the DSP 220. In some aspects, means for receiving a response may include the response receiving circuit.

Figure 7:
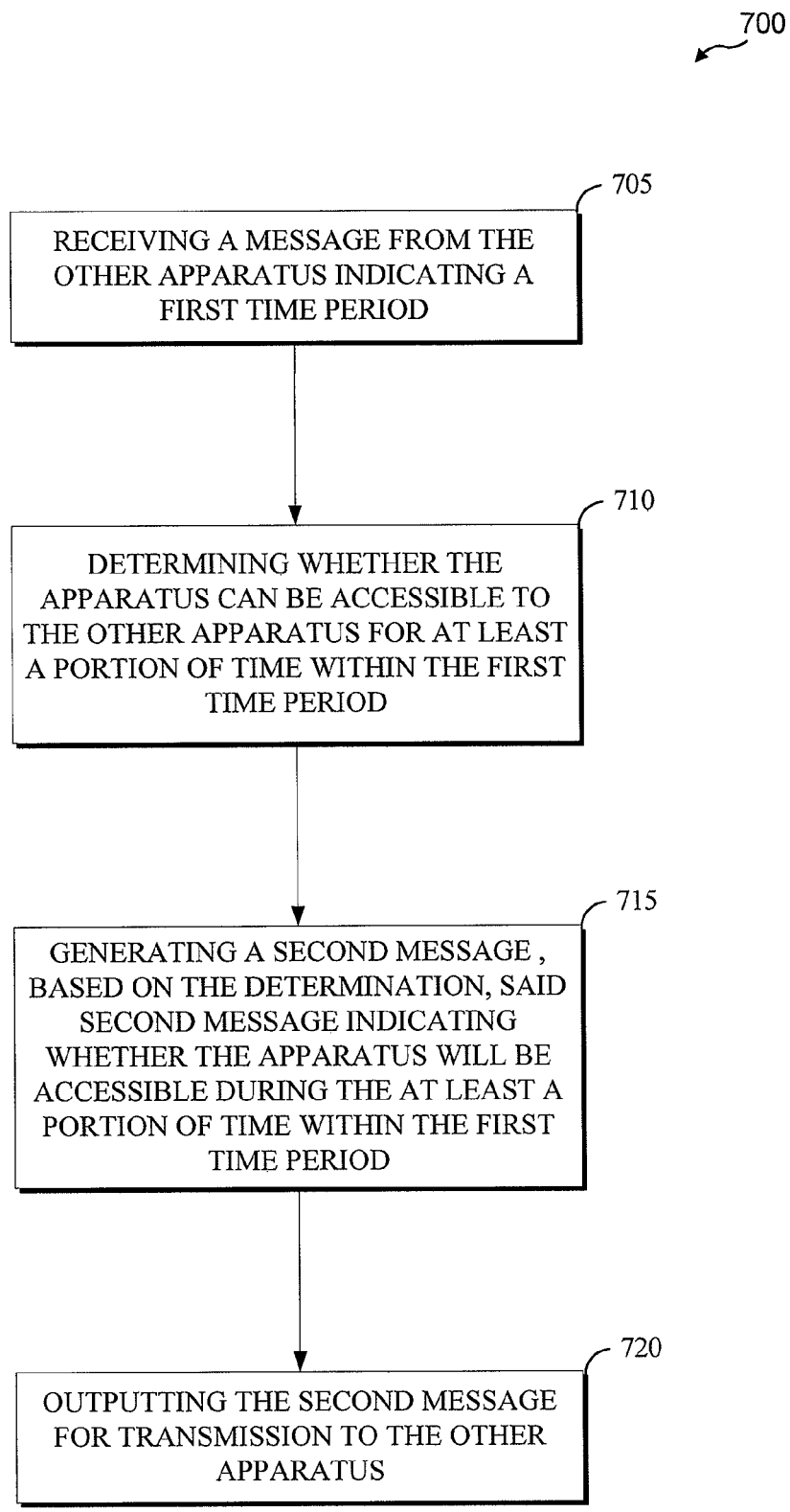
FIG. 7 illustrates a flowchart of a method for an access point of establishing an association between itself and a station.

Referring now to FIG. 7, a flowchart diagram depicting an exemplary aspect of the method of establishing an association with on a network by a device being requested to guarantee criteria are met is depicted and generally designated 700. Process 700 may be performed, in some aspects, by any of wireless nodes 110*a-b* and/or 115*a-c*. In some aspects, process 700 may be performed by the access point 105 on a wireless communication system 100. Other aspects of process 700 may instead be used for requesting other guarantees from the access point 105, for example maximum number of devices allowed to associate with the access point, minimum bandwidth required by the access point, etc.

Dependent upon the demands and operational requirements of the access point 105 or the wireless nodes 110*a-b* or 115*a-c*, process 700 may have different outcomes in different scenarios. In some aspects, access point 410 may be serving multiple stations 405, each having their own maximum time away being guaranteed by the access point 410 in order to establish the association. In some other aspects, the maximum time away of two or more stations 405 with the access point 410 may conflict, and the access point 410 may be able to only accommodate one of the two or more stations. In this aspect, process 700 may have a particular flow. In other aspects, the access point may be serving only one station 405 and may not have any conflicts. In such aspects, the process 700 may have a different flow.

At block 705 of method 700, the access point 410 receives a message from another apparatus indicating a first time period. This receiving may comprise receiving a message from the station 405 identifying a maximum time away period during which the station 405 requires the access point 410 guarantee it may be accessible to the station 405 before station 405 may associate with the access point 410. In some aspects, this criteria may be a maximum time away duration, through which the access point 410 may guarantee it may be accessible to the station 405 during a time duration. In other aspects, this criteria may be a maximum number of stations or relays or minimum bandwidth. In some aspects, the message from the station 405 may be in the form of a probe request frame 415 or an association request frame 425 and may be structured as depicted in FIG. 3.

At block 710, the access point 410 determines whether the apparatus can be accessible to the other apparatus for at least a portion of time within the first time period. This determination may comprise determining if the access point 410 can guarantee to meet the maximum time away requested by the station 405. In some aspects, this determination may be made by comparing the period requested to the current operational demands or requirements of the access point 410. In other aspects, this determination may be made by comparing the criteria requested to the established restrictions the access point was programmed to meet. In some other aspects, the determination may be made by a manufacturer restriction that the access point 410 not guarantee criteria for any station 405. In additional aspects, the determination may be made based on an operational requirement of the apparatus, user input, manufacturer specifications, and memory.

At block 715, the access point 410 may generate a second message, based on the determination, said second message indicating whether the apparatus will be accessible during the at least a portion of time within the first time period. The generated message may comprise a response message comprising an acceptance or rejection of the maximum time away guarantee request. The response message may include a message 300 as depicted in FIG. 3. In the message 300, access point 410 may utilize the included bits to indicate this is a response to a request and that the access point 410 either accepts the request to guarantee or rejects the request. In other aspects, if the access point 410 rejects the request to guarantee, the access point 410 may attempt to negotiate the guarantee by providing a suggested maximum time away value to guarantee. Alternatively, the access point 410 may reject the request to guarantee and not attempt to negotiate the guarantee which may indicate that the access point 410 is unable to make any guarantee for the maximum time away.

At block 720, the access point 410 may output the second message for transmission to the other apparatus. Outputting the second message may comprise the access point 410 transmitting its response message to the station 405. In some aspects, the response message may be embedded in a probe response frame 420. In other aspects, the response message may be embedded in an association response frame 430. After transmitting the response message, the access point 410 may continue in its operations as an access point.

Figure 8:
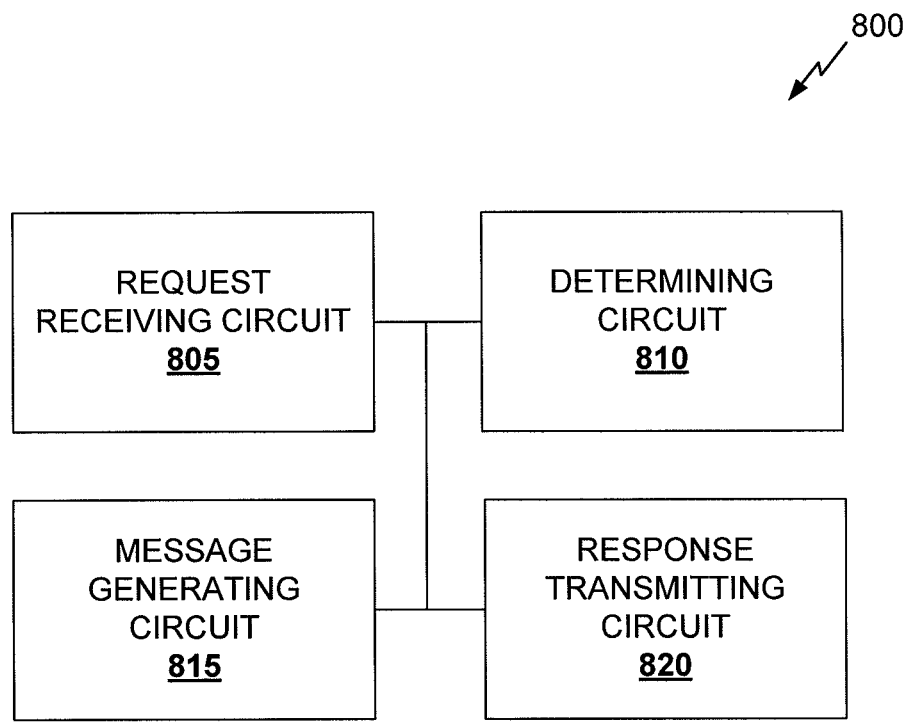
FIG. 8 represents a function block diagram of an access point establishing an association with a station wherein the association requires the access point make a guarantee to the station.

FIG. 8 is a functional block diagram of an exemplary wireless node 800 that may be employed within the wireless network 100. The device 800 comprises a request receiving circuit 805. The request receiving circuit 05 may be configured to perform one or more of the functions discussed above with respect to the block 705 illustrated in FIG. 7. The request receiving circuit 805 may correspond to one or more of the receiver 212, the transceiver 214, and/or the processor 204. In some aspects, means for receiving a message may include the request receiving circuit 805.

The device 800 further comprises a criteria guarantee determining circuit 810. The maximum time away determining circuit 810 may be configured to perform one or more of the functions discussed above with respect to block 710 illustrated in FIG. 7. The maximum time away determining circuit may correspond to one or more of the processor 204, the memory 306, or the user interface 326. In some aspects, means for determining whether the apparatus can guarantee to be accessible may include the maximum time away determining circuit 810.

The device 800 further comprises a message generating circuit 815. The message generating circuit may be configured to perform one or more of the functions discussed above with respect to block 715 shown in FIG. 7. The message generating circuit may correspond to one or more of the processor 204, the transmitter 210, or the transceiver 214. In some aspects, means for generating a second message may include the message generating circuit 815.

The device 800 further comprises a response transmitting circuit 820. The response transmitting circuit may be configured to perform one or more of the functions discussed above with respect to block 720 illustrated in FIG. 7. The response transmitting circuit may correspond to one or more of the processor 204, the transmitter 210, or the transceiver 214. In some aspects, means for transmitting the response may include the response transmitting circuit 820.

In some other aspects, the device 800 may further comprise a message embedding circuit (not shown) configured to embed the message in one of a probe request frame, a probe response frame, an association request frame, an association response frame, an action frame, and an action acknowledge frame. In some aspects, the embedding circuit may include the processor 204 and/or the DSP 220. In some aspects, means for embedding the message may include the message embedding circuit.

Figure 9:
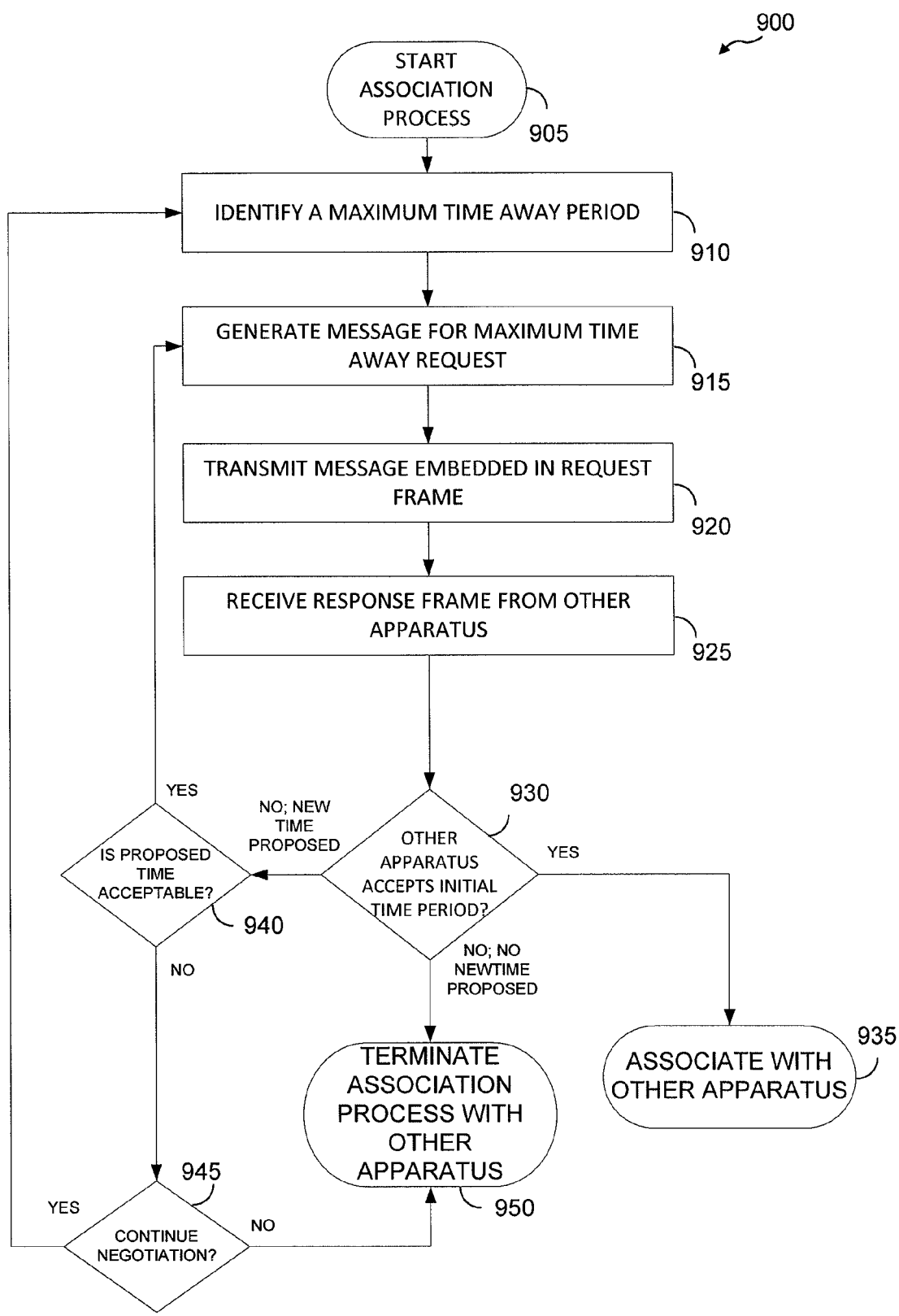
FIG. 9 shows a flowchart depicting a method of an apparatus requesting another apparatus to guarantee to be accessible for at least a portion of time during a maximum time period.

Referring now to FIG. 9, a flowchart diagram depicting an exemplary aspect of a method of an apparatus requesting another apparatus to guarantee to be accessible for at least a portion of time during a maximum time period before it may establish an association over a wireless network is depicted and generally designated 900. The aspect refers to a guarantee for a maximum time away request, but need not be limited to only maximum time away guarantees. Other aspects of process 900 may instead be used for requesting other guarantees from the access point 105, for example maximum number of devices allowed to associate with the access point, minimum bandwidth required by the access point, etc.

The process starts at block 905, indicating the starting of the association process. An aspect is an apparatus desiring to join the wireless network. Block 910 indicates the first process of the associating method 900. At block 910, the apparatus identifies a maximum time away period. In an aspect, the identification may utilize a processor to determine the maximum time away period from current operations of the apparatus. In another aspect, the maximum time away period may be established by the manufacturer or saved in memory or input by a user. In additional aspects, the maximum time away period may be made based on an operational requirement of the apparatus, user input, manufacturer specifications, and memory.

Block 915 indicates the generating of a message for maximum time away request. This message may take the form of message 300 of FIG. 3, and may include bits and fields to represent and communicate the maximum time away request to the other device. Block 920 indicates the transmitting of the message 300 embedded in a request frame. Some aspects may transmit in a probe request frame 415. Other aspects may utilize an association request frame 425 or other action frames or acknowledgement frames.

Block 925 indicates the receiving of a response frame from the other apparatus. Based upon this response frame, the process must make a determination as to whether the response from the other apparatus accepts the initial time period at block 930. If the other apparatus did accept the initial time period, then the apparatus associates with the other apparatus at block 935. If the determination at block 930 is that the other apparatus did not accept the initial time period but the other apparatus proposed a new time, then the process reaches another decision as to whether the proposed time is acceptable at block 940. If the process determines the proposed time is acceptable at block 940, then the apparatus generates a message for maximum time request at block 915 and repeats the process described above. If the process determines at block 940 that the proposed time is not acceptable, then the process must determine, at block 945, if it should continue negotiation. If it decides to continue negotiation, then the process returns to block 910 to restart the entire process with a new initial time period. If it decides at block 945 not to continue negotiation, then the process terminates the association process with the other apparatus at block 950. If at block 930 the process determines the other apparatus did not accept the initial time period and it did not propose a new time, then it may proceed to terminate the association process with the other apparatus as block 950.

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like. Further, a "channel width" as used herein may encompass or may also be referred to as a bandwidth in certain aspects.

As used herein, a phrase referring to "at least one of" a list of items refers to any combination of those items, including single members. As an example, "at least one of: a, b, or c" is intended to cover: a, b, c, a-b, a-c, b-c, and a-b-c, and "at least one of: a, b, and c" is intended to cover a, b, c, a-b, a-c, b-c, and a-b-c. Similarly, a phrase referring to "one or more of" a list of items refers to any combination of those items, including single members. For example, "one or more of: x, y, and z" and "one or more of: x, y, or z" is intended to cover a, b, c, a-c, b-c, a-b, and a-b-c.

The various operations of methods described above may be performed by any suitable means capable of performing the operations, such as various hardware and/or software component(s), circuits, and/or module(s). Generally, any operations illustrated in the Figures may be performed by corresponding functional means capable of performing the operations.

As used herein, the term interface may refer to hardware or software configured to connect two or more devices together. For example, an interface may be a part of a processor or a bus and may be configured to allow communication of information or data between the devices. The interface may be integrated into a chip or other device. For example, in some aspects, an interface may comprise a receiver configured to receive information or communications from a device at another device. The interface (e.g., of a processor or a bus) may receive information or data processed by a front end or another device or may process information received. In some aspects, an interface may comprise a transmitter configured to transmit or communicate information or data to another device. Thus, the interface may transmit information or data or may prepare information or data for outputting for transmission (e.g., via a bus).

The various illustrative logical blocks, modules and circuits described in connection with the present disclosure may be implemented or performed with a general purpose processor, a digital signal processor (DSP), an application specific integrated circuit (ASIC), a field programmable gate array signal (FPGA) or other programmable logic device (PLD), discrete gate or transistor logic, discrete hardware components or any combination thereof designed to perform the functions described herein. A general purpose processor may be a microprocessor, but in the alternative, the processor may be any commercially available processor, controller, microcontroller or state machine. A processor may also be implemented as a combination of computing devices, e.g., a combination of a DSP and a microprocessor, a plurality of microprocessors, one or more microprocessors in conjunction with a DSP core, or any other such configuration.

In one or more aspects, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and Blu-ray disc where disks usually reproduce data magnetically, while discs reproduce data optically with lasers. Thus, in some aspects computer readable medium may comprise non-transitory computer readable medium (e.g., tangible media). In addition, in some aspects computer readable medium may comprise transitory computer readable medium (e.g., a signal). Combinations of the above should also be included within the scope of computer-readable media.

The methods disclosed herein comprise one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims.

The functions described may be implemented in hardware, software, firmware or any combination thereof. If implemented in software, the functions may be stored as one or more instructions on a computer-readable medium. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, include compact disc (CD), laser disc, optical disc, digital versatile disc (DVD), floppy disk, and Blu-ray® disc where disks usually reproduce data magnetically, while discs reproduce data optically with lasers.

Thus, certain aspects may comprise a computer program product for performing the operations presented herein. For example, such a computer program product may comprise a computer readable medium having instructions stored (and/or encoded) thereon, the instructions being executable by one or more processors to perform the operations described herein. For certain aspects, the computer program product may include packaging material.

Software or instructions may also be transmitted over a transmission medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of transmission medium.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the methods and apparatus described above without departing from the scope of the claims.

While the foregoing is directed to aspects of the present disclosure, other and further aspects of the disclosure may be devised without departing from the basic scope thereof, and the scope thereof is determined by the claims that follow.

What is claimed is:

1. An apparatus for wireless communication, comprising:
a processing system executing instructions stored in memory, configured to:
generate a first message including at least one bit indicating a request that a second apparatus guarantee to be accessible to the apparatus for at least a portion of a first time period,
process a second message from the second apparatus, the second message including at least one bit indicating whether the second apparatus guarantees to be accessible to the apparatus for at least the portion of the first time period, and
determine, based on the at least one bit in the second message, whether the second apparatus guarantees to be accessible to the apparatus for at least the portion of the first time period, wherein a first value of the at least one bit indicates that the second apparatus guarantees to be accessible to the apparatus for at least the portion of the first time period, and wherein a second value of the at least one bit indicates that the second apparatus does not guarantee to be accessible to the apparatus for at least the portion of the first time period, and wherein if the second apparatus does not guarantee to be accessible for at least the portion of the first time period, the second message indicates a second time period during which the second apparatus guarantees to be accessible to the apparatus for at least a portion of the second time period; and an interface configured to:
output the first message for transmission to the second apparatus, wherein the first message is output to the second apparatus before the apparatus establishes an association with the second apparatus, and
receive the second message.

2. The apparatus of claim 1 wherein at least one of the portion or the first time period is based on at least one of operational requirements of the apparatus, user inputs, manufacturer specifications, or data stored in memory of the apparatus.

3. The apparatus of claim 1, wherein the processing system is configured to generate the first message to further indicate at least one of: whether or not the first message is a request or a response; whether or not the apparatus is requesting a maximum time guarantee; or whether or not the first message includes a field containing the first time period during which the second apparatus could be accessible.

4. The apparatus of claim 1, wherein the processing system is further configured to embed the first message in any one of a probe request frame, a probe response frame, an association request frame, an association response frame, an action frame, or an action acknowledge frame, and wherein the interface is further configured to output the frame for transmission.

5. The apparatus of claim 1, wherein the processing system is further configured to generate a third message acknowledging that the second apparatus guarantees to be accessible to the apparatus for at least the portion of the second time period, and wherein the interface is further configured to output the third message for transmission.

6. The apparatus of claim 5, wherein the processing system is configured to embed the third message in an association request frame or a probe request frame, and wherein the interface is further configured to output the association request or probe request frame for transmission.

7. An apparatus for wireless communication, comprising:
an interface for receiving a first message from a second apparatus, the first message including at least one bit indicating a request that the apparatus guarantee to be accessible to the second apparatus for at least a portion of a first time period, the first message being received before the second apparatus establishes an association with the apparatus;
a processing system configured to:
determine whether the apparatus can be accessible to the second apparatus for at least the portion of the first time period; and
generate a second message, based on the determination, including at least one bit indicating whether the apparatus guarantees be accessible to the second apparatus for at least the portion of the first time period, wherein a first value of the at least one bit indicates that the apparatus guarantees to be accessible to the second apparatus for at least the portion of the first time period and wherein a second value of the at least one bit indicates that the apparatus does not guarantee to be accessible to the second apparatus for at least the portion of the first time period, and wherein the processing system is further configured to, if the apparatus does not guarantee to be accessible for at least the portion of the first time period, determine a second time period during which the apparatus can be accessible to the second apparatus for at least a portion of the second time period, the second message indicating the second time period; and
an interface for outputting the second message for transmission to the second apparatus.

8. The apparatus of claim 7, wherein the determination is based on at least one of operational requirements of the apparatus, user inputs, manufacturer specifications, guarantees made to one or more third apparatuses, or data stored in memory of the apparatus.

9. The apparatus of claim 7, wherein the processing system is further configured to receive the first message in any one of a probe request frame, a probe response frame, an association request frame, an association response frame, an action frame, or an action acknowledge frame, and wherein the interface is further configured to output the frame for transmission.

10. The apparatus of claim 7, wherein the determination of the second time period is based on at least one of operational requirements of the apparatus, user inputs, manufacturer specifications, guarantees made to one or more third apparatuses, or data stored in memory of the apparatus.

11. The apparatus of claim 7, wherein the second message is generated to further indicate whether or not the apparatus is accepting or rejecting a maximum time guarantee indicated in the first message.

12. The apparatus of claim 7, wherein the interface for receiving is further configured to receive a third message from the second apparatus acknowledging that the apparatus will be accessible to the second apparatus for at least the portion of the second time period.

13. A method for an apparatus to establish an association with a second apparatus on a wireless network, comprising:
generating a first message including at least one bit indicating a request that the second apparatus guarantee to be accessible to the apparatus for at least a portion of a first time period;
processing a second message received from the second apparatus, the second message including at least one bit indicating that the second apparatus guarantees to be accessible to the apparatus for at least the portion of the first time period;
outputting the first message for transmission to the second apparatus, wherein the first message is output to the second apparatus before the apparatus establishes an association with the second apparatus; and
determining, based on the at least one bit in the second message, whether the second apparatus guarantees to be accessible to the apparatus for at least the portion of the first time period, wherein a first value of the at least one bit indicates that the second apparatus guarantees to be accessible to the apparatus for at least the portion of the first time period and wherein a second value of the at least one bit indicates that the second apparatus does not guarantee to be accessible to the apparatus for at least the portion of the first time period, and wherein if the second apparatus does not guarantee to be accessible for at least the portion of the first time period, the second message indicates a second time period during which the second apparatus guarantees to be accessible to the apparatus for at least a portion of the second time period.

14. The method of claim 13, wherein at least one of the portion or the first time period is based on at least one of operational requirements of the apparatus, user inputs, manufacturer specifications, guarantees made to one or more third apparatuses, or data stored in memory of the apparatus.

15. The method of claim 13, wherein generating the first message comprises indicating in the first message at least one of: whether or not the first message is a request or response; whether or not the apparatus is requesting a maximum time guarantee; or whether or not the first message includes a field containing the first time period during which the second apparatus is to guarantee to be accessible.

16. The method of claim 13, further comprising embedding the first message in any one of a probe request frame, a probe response frame, an association request frame, an association response frame, an action frame, or an action acknowledge frame and outputting the frame for transmission to the second apparatus.

17. The method of claim 13, further comprising:
generating a third message acknowledging that the second apparatus will be accessible to the apparatus for at least the portion of the second time period; and
outputting the third message for transmission to the second apparatus.

18. The method of claim 17, further comprising embedding the third message in an association request frame or a probe request frame, and outputting the association request or probe request frame for transmission to the second apparatus.

19. A method for an apparatus to establish an association with a second apparatus on a wireless network, comprising:
receiving a message from the second apparatus, the first message including at least one bit indicating a request that the apparatus to guarantee to be accessible to the second apparatus for at least a portion of a first time period, the first message being received before the second apparatus establishes an association with the apparatus;
determining whether the apparatus can be accessible to the second apparatus for at least the portion of the first time period;
generating a second message, based on the determination, said second message including at least one bit indicating whether the apparatus guarantees be accessible to the second apparatus for at least the portion of the first time period, wherein a first value of the at least one bit indicates that the apparatus guarantees to be accessible to the second apparatus for at least the portion of the first time period and wherein a second value of the at least one bit indicates that the apparatus does not guarantee to be accessible to the second apparatus for at least the portion of the first time period, and wherein if the apparatus does not guarantee to be accessible for at least the portion of the first time period, the method further comprises determining a second time period during which the apparatus can be accessible to the second apparatus for at least a portion of the second time period, the second message indicating the second time period; and
outputting the second message for transmission to the second apparatus.

20. The method of claim 19, wherein the determination whether the apparatus can be accessible to the second apparatus for at least the portion of the first time period is based on at least one of operational requirements of the apparatus, user inputs, manufacturer specifications, guarantees made to one or more third apparatuses, and data stored in memory of the apparatus.

21. The method of claim 19, further comprising embedding the second message in any one of a probe request frame, a probe response frame, an association request frame, an association response frame, an action frame, or an action acknowledge frame, and outputting the frame for transmission to the second apparatus.

22. The method of claim 19, wherein the determination of the second time period is based on at least one of operational requirements of the apparatus, user inputs, manufacturer specifications, guarantees made to one or more third apparatuses, and data stored in memory or the apparatus.

23. The method of claim 19, wherein the second message is generated to further indicate whether or not the apparatus is accepting or rejecting a maximum time guarantee indicated in the first message.

24. The method of claim 19, further comprising receiving a third message from the second apparatus acknowledging that the apparatus will be accessible to the second apparatus for at least the portion of the second time period.

* * * * *